April 19, 1927.
L. N. BOWMAN
LIQUID FUEL
Filed July 13, 1925
1,625,236
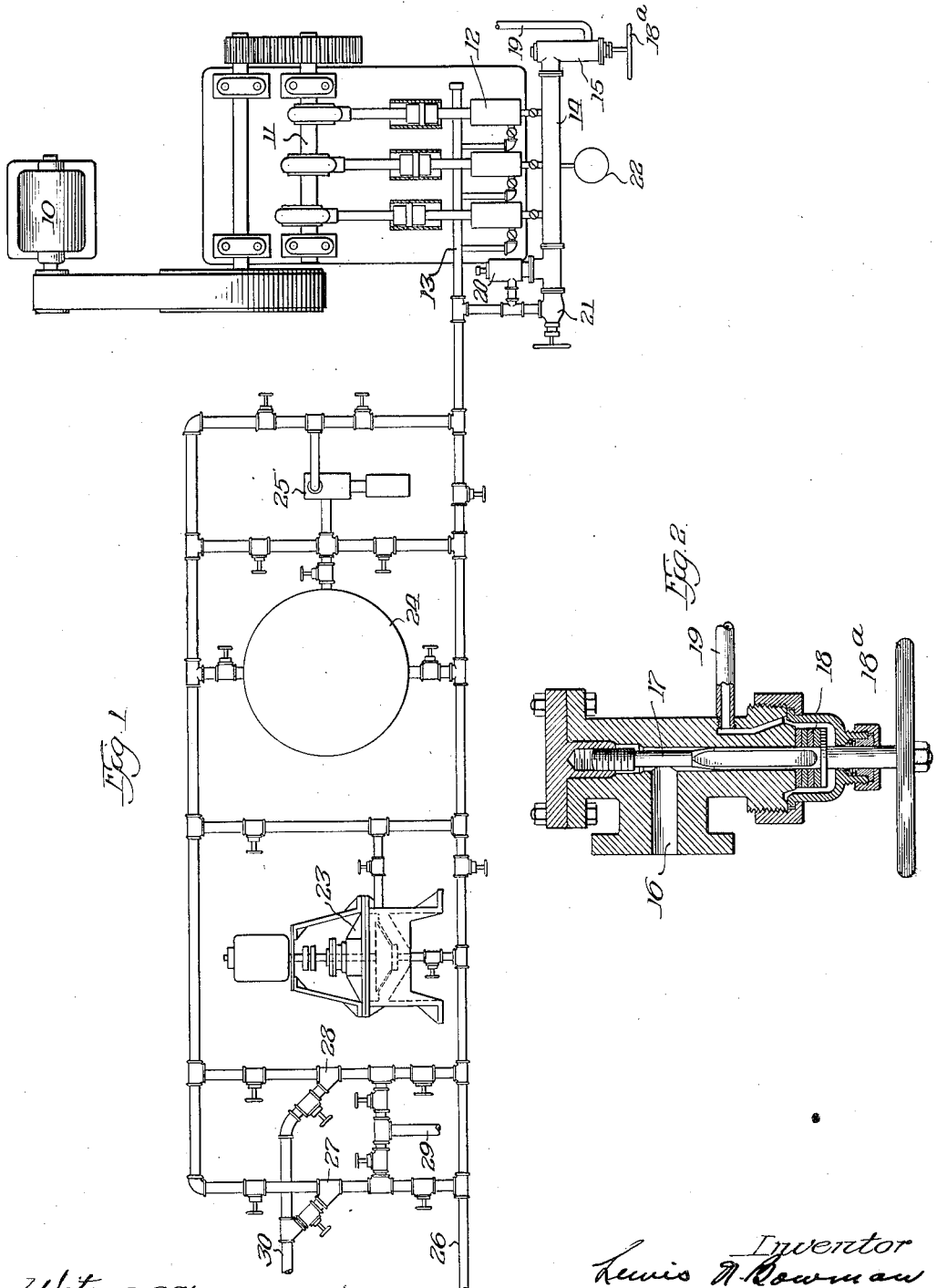

Patented Apr. 19, 1927.

1,625,236

UNITED STATES PATENT OFFICE.

LEWIS N. BOWMAN, OF CHICAGO, ILLINOIS, ASSIGNOR OF ONE-EIGHTH TO H. H. HARRISON AND ONE-EIGHTH TO A. R. WHITE, BOTH OF CHICAGO, ILLINOIS.

LIQUID FUEL.

Application filed July 13, 1925. Serial No. 43,370.

My invention relates to a process for treating the residual product from petroleum cracking processes whereby to render the said product adaptable for numerous uses.

The residue from distilling processes is commonly in the form of a low gravity oil having a high B. t. u. content but containing, in temporary suspension, large quantities of carbon in a finely divided condition. The state of subdivision is such that the carbon particles cannot be removed by screening or straining and yet precipitation will take place continuously for a relatively long period of time, resulting in the clogging of pipe lines, burners and containing vessels. For this reason, the product is of little value commercially, its use being limited to combustion at a point closely adjacent to the point of production.

In view of the heating value of the product, I have contended that it should be made available for general use, and to that end have proven that if the particles in temporary suspension therein be reduced in size to a point approaching molecular subdivision, at which point the force of gravity will be overbalanced by the surface forces, the particles will remain in relatively permanent suspension. Thus the heating value of the liquid will not be reduced as occurs when the free carbon is removed.

I am aware that efforts have been made to accomplish the result of more complete subdivision of the carbon particles, but the expense incident to any such process has defeated the main purpose—that of producing a permanent and cheap, liquid fuel. In the process herein disclosed, the expense of operation is comparatively small and the results secured are highly satisfactory.

In the carrying out of the process, the liquid containing the carbon in suspension is passed between closely adjacent surfaces under extremely high pressure with the result that there is believed to be not only a breaking up of the free carbon, but an actual molecular redistribution. To what extent this is secured is not at this time known, but at any rate, the resultant product has a high heating value and there is no apparent precipitation, even after standing undisturbed for several months.

I will not attempt herein to state definitely that there is a chemical change due to readjustment of the carbon molecules, although I believe such to be the case. In Liddell, Colloidal Chemistry, it is said, "If subdivision is profound enough, a chemical combination may result. In fact, before substances react chemically, their particles must first be brought into close proximity by solution, fusion, ionization or even pressure, as was shown by W. Spring who caused dry powders to unite chemically by extremely high pressure."

The enormous pressure exerted in the treatment together with the concentrated stress resulting from the frictional resistance, is believed to cause an enormously increased activity in the molecules and a consequent readjustment. Even though this theory be incorrect, the fact remains that the carbon particles after having been subjected to the described action are in a state of extreme colloidal subdivision.

The process will be more readily understood by reference to the accompanying drawings, in which;

Fig. 1 is a diagrammatical view of mechanism suited to the carrying out of the process, and Fig. 2 is a sectional view through a valve constituting the direct means for effecting the physical change in the substance.

Referring more particularly to Fig. 1, it will be seen that I provide a motor, 10, connected by suitable speed-reducing devices to a crank shaft 11, through which the pumps 12 are actuated. A three cylinder pump is illustrated. Untreated oil is received through the manifold 13, the discharge from the pumps being into a manifold, 14, and thence through the valve 15, illustrated in detail in Fig. 2. This valve comprises a casing, having an inlet, 16, a valve stem 17, and a plurality of plates, 18, having ground faces, between which the liquid is forced under pressure of three to five thousand pounds per square inch. The treated oil is discharged through the pipe 19. The space between the faces of the discs is controlled by the hand wheel 18$^a$. This form of valve is not novel and I wish it to be understood that it constitutes only one of several different devices that may be employed for accomplishing the same result. It will be understood also that I may consider it necessary or desirable to repeat the process one or more times in order to effect the most desirable result.

A relief valve 20, is provided and a shut-off valve 21. These, with the pressure guage 22, comprise the simple mechanism employed.

In certain cases, the residue from the petroleum cracking process may contain relatively large particles of carbon in the form of coke or soft carbon and in order to secure relative uniformity in the size of the particles before attempting to pass them through the homogenizing valve, I may prefer to first pass the liquid through a grinder 23, illustrated in Fig. 1.

In the piping diagram I show a storage tank, 24, and an auxiliary or supply pump, 25. Under normal circumstances, the supply of oil will be furnished through the pipe 26, thence through the grinder, if desired, and thence into the storage tank or direct to the homogenizer. Or if the supply of oil be interrupted, it may be withdrawn from the storage tank.

I may prefer to utilize strainers, indicated at 27, 28 for removing large carbon particles, instead of reducing them in size by the grinder 23, and piping is provided for admitting steam to blow out these strainers alternately at intervals if desired. For example, steam may be admitted through the pipe, 29, thence through the strainer 27, to the discharge pipe 30, while the other strainer continues in operation. By opening and closing the proper valves, the operation may be reversed.

In order to secure the best results, I have found it desirable to treat the liquid at a temperature of 100–150 degrees F., although satisfactory results are possible at other temperatures. In practice, the oil is taken direct from the stills with such reduction of temperature as will occur in transporting it to the place of treatment.

Obviously, the exact mechanism employed is unimportant, as other means might be utilized, for carrying out the described process. I therefore do not wish to be limited except as indicated in the appended claims.

I claim:

1. A liquid fuel obtained by passing a residual oil containing free carbon in temporary suspension between a pair of closely contiguous surfaces under relatively extremely high pressure.

2. A liquid fuel obtained by passing a residual oil containing free carbon in temporary suspension between a pair of closely contiguous surfaces under relatively extremely high pressure, the oil immediately prior to treatment being at a temperature exceeding 100 degrees F.

3. A liquid fuel obtained by passing a residual oil containing free carbon in temporary suspension between surfaces so closely positioned that a pressure of approximately three thousand pounds per square inch is necessary to force the oil therebetween.

4. A liquid fuel containing carbon particles in a state of extreme colloidal subdivision, obtained by passing a residual oil containing free carbon particles of a size that will deposit between closely contiguous surfaces, under relatively extremely high pressure.

In testimony whereof I have affixed my signature.

LEWIS N. BOWMAN.